UNITED STATES PATENT OFFICE.

JAMES F. O'SHAUGHNESSY, OF NEW YORK, N. Y., ASSIGNOR TO THE UNITED STATES COTTON SEED COMPANY, OF SAME PLACE.

PROCESS OF TREATING COTTON-SEED.

SPECIFICATION forming part of Letters Patent No. 298,618, dated May 13, 1884.

Application filed December 17, 1883. (No specimens.)

*To all whom it may concern:*

Be it known that I, JAMES F. O'SHAUGHNESSY, of New York, in the county of New York and State of New York, have invented a new and useful Improvement in Processes of Treating Cotton-Seed; and I do hereby declare that the following is a full, clear, and exact description of the same.

My invention relates to the treatment of cotton fiber adhering to the seeds as they come from the gin.

The object of the invention is to separate the fiber as perfectly as possible from the hulls, and to secure it in a good condition fitted for the manufacture of paper, or for any other uses to which such fiber may be appropriated.

In the treatment of cotton-seed, commonly, the seeds are cracked and the kernel removed from the hull. These kernels are pressed separately, for purposes well known. Heretofore the hulls, with their adhering fiber, have been thrown aside as waste material, or, at best, have been utilized only as fuel. Heretofore it has been suggested to heat the seed in order to shrink the hull from the kernel, and then crack it, and after it has been cracked to sift out the kernel, and then by a separate process to regrind the residue and subsequently remove the pulverized hull from the fiber. The disadvantage of this process is that in the grinding or crushing of the hull and kernel together the fiber and hull become to some extent saturated or smeared with the oily substance of the kernel, which interferes with the perfect separation of the fiber from the pulverized hull, and also renders the fiber rancid. Further, when the kernel is heated in the hull, any considerable amount of heat will start the oil from the kernel.

My invention consists in taking the hulls, with their adhering fiber, separate from the kernels, and in subjecting the same to heat sufficient to dry the hulls and render them brittle without injuring the fiber, and then crushing and grinding, so as to pulverize the hulls and loosen them, and finally in sifting the residue, so as to separate the pulverized hulls from the fiber.

In carrying out my invention I separate the hull from the kernel by cracking it and removing the kernel in the ordinary manner; or I may take the separate hulls, with their adhering fiber, as they come from an ordinary mill. These hulls I subject to heat applied, preferably, by passing through the mass a current of heated air, taking care that the heat be not sufficient to injure the fiber. A greater degree of heat may be used upon the separate hulls with safety, and thus the hulls may be rendered more brittle and more easily separated from the fiber than can be done when the heat is applied to the seed with the kernel within. I then grind or crush these hulls by any suitable or well-known mill. The hulls having been removed from the kernel, when thus treated by heat and ground, are entirely free from any oily substance, and may be pulverized and separated readily from the fiber. There is no trace of oil or oily substance from the kernel to cause the pulverized hull to adhere to the fiber, or to soil the fiber itself. The heated air acts readily upon the dry hull, and after the grinding process it is more readily reduced and easily separated from the fiber.

The hulls may be used as a fertilizer or to mix with the kernel after the oil has been expressed, and the fiber is used for paper or for any other purposes for which it is required in the arts.

I claim—

The hereinbefore-described process of removing the fiber of the hulls of cotton-seed by first heating said hulls after the kernels have been removed from them, then crushing or grinding the hulls, and finally separating the fiber from the pulverized hulls, substantially as described.

In testimony whereof I have signed my name to this specification in the presence of two subscribing witnesses.

JAMES F. O'SHAUGHNESSY.

Witnesses:
FRANK L. MIDDLETON,
WALTER DONALDSON.

Correction in Letters Patent No. 298,618.

It is hereby certified that in Letters Patent No. 298,618, granted May 13, 1884, upon the application of James F. O'Shaughnessy, of New York, New York, for an improvement in the "Process of Treating Cotton Seed," the name of the assignee was written and printed "United States Cotton Seed Company;" that said name should have been written and printed *United States Cotton-Seed Cleaning Company*; and that the proper correction has been made in the files and records pertaining to the case in the Patent Office, and should be read in the Letters Patent to make the same conform thereto.

Signed, countersigned, and sealed this 20th day of May, A. D. 1884.

[SEAL.]
                                    M. L. JOSLYN,
*Acting Secretary of the Interior.*

Countersigned:
    BENJ. BUTTERWORTH,
        *Commissioner of Patents.*